United States Patent [19]

Saeman

[11] 4,354,864
[45] * Oct. 19, 1982

[54] PROCESS FOR PRODUCTION OF LAYERED GLASS BATCH PELLETS

[75] Inventor: Walter C. Saeman, Cleveland, Tenn.

[73] Assignee: Olin Corporation, New Haven, Conn.

[*] Notice: The portion of the term of this patent subsequent to Oct. 6, 1998, has been disclaimed.

[21] Appl. No.: 238,256

[22] Filed: Feb. 25, 1981

Related U.S. Application Data

[63] Continuation-in-part of Ser. No. 123,153, Feb. 21, 1980, Pat. No. 4,293,324.

[51] Int. Cl.³ .............................. C03B 1/00; C03C 1/02
[52] U.S. Cl. .......................................... 65/27; 65/134; 264/113; 264/114; 501/29; 501/70
[58] Field of Search ................ 65/27, 21.3, 32, 134; 264/15, 113, 114, 117; 501/29, 70

[56] References Cited

U.S. PATENT DOCUMENTS

| | | | |
|---|---|---|---|
| 2,366,473 | 1/1945 | Bair | 501/29 |
| 3,149,983 | 9/1964 | Maris et al. | 501/30 |
| 3,451,831 | 6/1969 | Miche et al. | 501/29 |
| 3,760,051 | 9/1973 | Eirich et al. | 264/117 |
| 3,788,832 | 1/1974 | Nesbitt et al. | 65/27 X |
| 4,293,324 | 10/1981 | Saeman | 65/27 |

FOREIGN PATENT DOCUMENTS 1282868  7/1972  United Kingdom ................ 65/27

OTHER PUBLICATIONS

Sumner, "Method of Preparing Agglomerated Glass-Batch Ingredients", South African Published Patent Application No. 69-6971, Oct. 2, 1969.

*Primary Examiner*—Richard V. Fisher
*Attorney, Agent, or Firm*—James B. Haglind; Donald F. Clements

[57] ABSTRACT

Layered glass batch pellets are produced in a continuous process which comprises the steps of:
- (a) maintaining in the pelletizing zone of a rotary apparatus a moving bed of recycle pellets,
- (b) feeding sand and particles of a calcium carbonate source into the pelletizing zone,
- (c) feeding a $Na_2O$ source comprised of a solution of sodium hydroxide into the pelletizing zone, the recycle pellets being coated with a layer comprised of the solution of sodium hydroxide, the sand and the calcium carbonate source and forming layered pellets,
- (d) passing the layered pellets into a heated drying zone to form dried layered pellets, the dried layered pellets having a residual moisture content of from about 4 to about 12 percent by weight,
- (e) passing the dried layered pellets from the drying zone to a recycle zone,
- (f) recycling a portion of the dried layered pellets to the pelletizing zone as the recycle pellets, and
- (g) recovering a portion of the dried layered pellets from the recycle zone.

The novel layered glass batch pellets produced are of a homogeneous composition in which the segregation of the $Na_2O$ is minimized. The layered pellets are non-cohesive and non-hygroscopic and have specific gravities in the range of from about 1.90 to 2.30.

10 Claims, 8 Drawing Figures

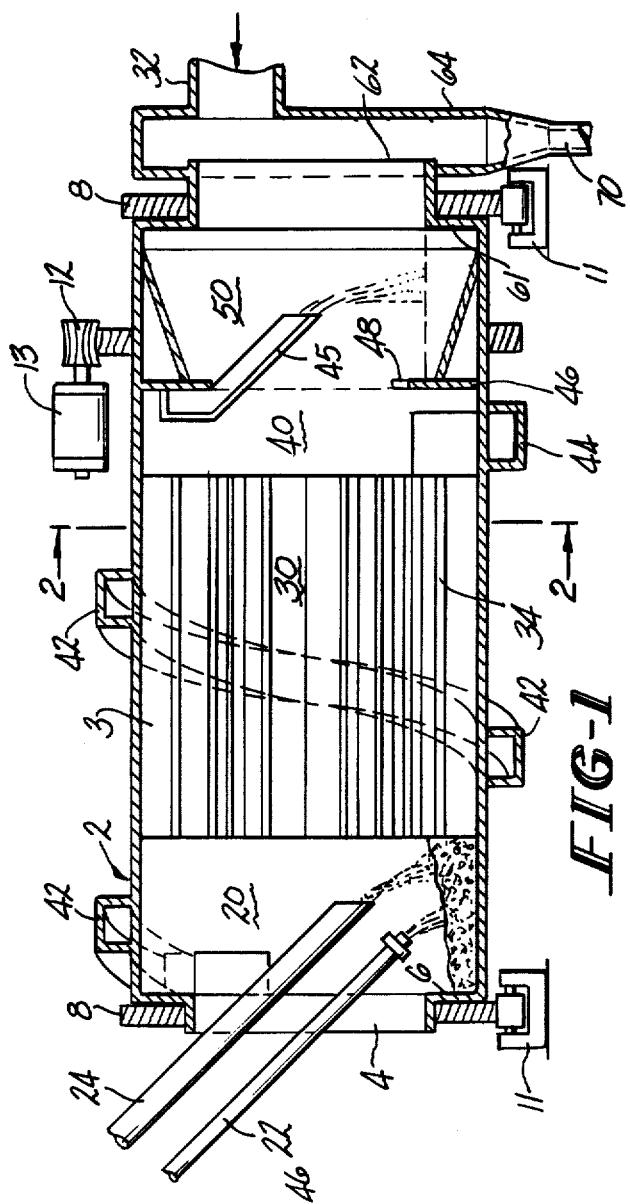
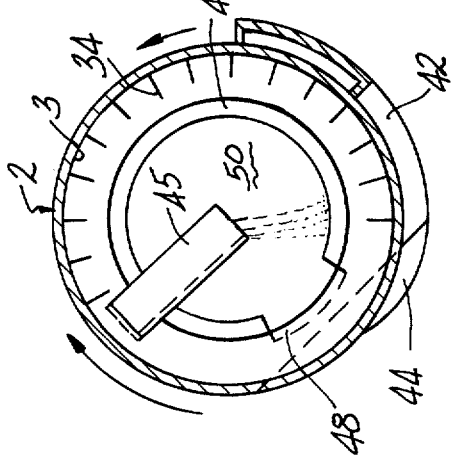
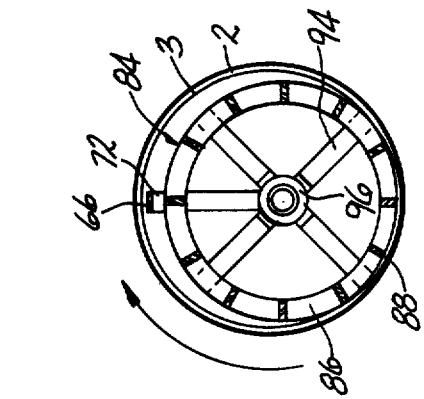
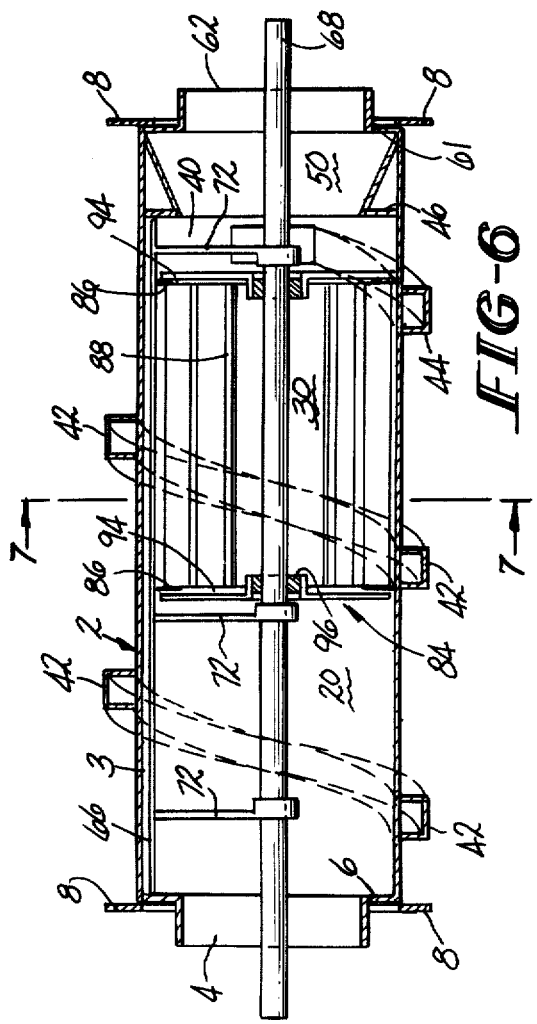
FIG-1
FIG-2
FIG-7
FIG-6

PROCESS FOR PRODUCTION OF LAYERED GLASS BATCH PELLETS

This application is a continuation-in-part of application U.S. Ser. No. 123,153 filed Feb. 21, 1980, now U.S. Pat. No. 4,293,324.

This invention relates to the production of pellets used in the manufacture of glass.

Glass such as soda-lime glass is produced by reacting and melting sand, soda ash, and limestone or dolomite and other glass batch ingredients in a furnace to form a homogeneous melt. The use of sodium carbonate in the glass batch introduces dust particles which are entrained in furnace gases. On contact with lining materials in the furnace, sodium carbonate dust particles accelerate the attack of the refractory materials resulting in increased maintenance costs. One method known to suppress $Na_2CO_3$ dust formation is to add water to the glass batch prior to its being fed to the furnace. This water must be evaporated in the high temperature atmosphere of the furnace and results in a curtailment of furnace melting capacity and an increase in fuel consumption per unit of glass produced.

An improvement is obtained by the substitution of solutions of sodium hydroxide for water and a portion of the sodium carbonate used. U.S. Pat. No. 3,149,983 issued Sept. 22, 1964, to L. Maris et al describes the use of caustic soda with soda ash in the production of glass making batches containing sand. Glass batches produced by this method have a tendency to cake and result in handling difficulties.

South African Patent Application No. 69-6971 by C. A. Sumner teaches the preparation of agglomerated glass batch ingredients in a rotary drum having rods to develop a falling curtain of particles onto which a caustic soda solution is sprayed. Similarly, British Pat. No. 1,282,868 issued July 26, 1972, to F. G. West-Oram teaches the production of a glass batch in pellet form from sand, limestone, and caustic soda in a rotary dryer with flights. The pellets formed are heated to remove water and to accelerate the reaction of the caustic soda with the sand.

Agglomerates prepared by the processes of South African Application No. 69-6971 and British Pat. No. 1,282,868 as well as agglomerates produced in disk-type pelletizing apparatus are formed in sequential pelletization and drying stages where caustic in the interior of the pellet is not completely carbonated. Such pellets are, therefore, hygroscopic and permit segregation of the soluble $Na_2O$ component during drying. These properties result in handling and storage problems and lead to non-homogeneous compositions of the molten glass.

Thus there is a need for a process for the production of glass batch pellets having improved handling and storage properties and of a homogeneous composition from the interior of the pellet to the surface.

It is an object of the present invention to provide a process for the production of glass batch pellets having a homogeneous composition from the interior of the pellet to the surface.

Another object of this invention is to provide a process for the production of non-hygroscopic glass batch pellets having improved handling and storage properties.

A further object of this invention is to provide a process for the production of glass batch pellets which can be produced efficiently in compact apparatus.

An additional object of the present invention is to provide a process for the production of anhydrous glass batch pellets which are non-dusting in the glass furnace.

Yet another object of this invention is to provide a process for the production of glass batch pellets having a multilayer structure and improved pellet strength.

A further object of the present invention is to provide a process for the production of glass batch pellets having controlled size distribution.

A still further object of this invention is to provide glass batch pellets of sufficient strength and of such a size distribution that they can be pre-heated by contact with heated gases in short exposure times and with a minimum of breakage.

These and other objects of the present invention are accomplished in a continuous process for the production of layered pellets for glass production which comprises the steps of:

(a) maintaining in the pelletizing zone of a rotary apparatus a moving bed of recycle pellets, (b) feeding sand and particles of a calcium carbonate source into the pelletizing zone, (c) feeding a $Na_2O$ source comprised of a solution of sodium hydroxide into the pelletizing zone, the recycle pellets being coated with a layer comprised of the solution of sodium hydroxide, the sand and the calcium carbonate source and forming layered pellets, (d) passing the layered pellets into a heated drying zone to form dried layered pellets, the dried layered pellets having a residual moisture content of from about 4 to about 12 percent by weight, (e) passing the dried layered pellets from the drying zone to a recycle zone, (f) recycling a portion of the dried layered pellets to the pelletizing zone as the recycle pellets, and (g) recovering a portion of the dried layered pellets from the recycle zone.

The above objects and advantages of the present invention may be more readily understood by reference to the following detailed description and to the accompanying FIGURES. Corresponding parts have the same numbers in all FIGURES.

FIG. 1 is an elevational view in section of the rotary apparatus which may be used in practicing the present invention.

FIG. 2 is a cross-sectional view taken along the lines 2—2 of FIG. 1.

Figure 3:
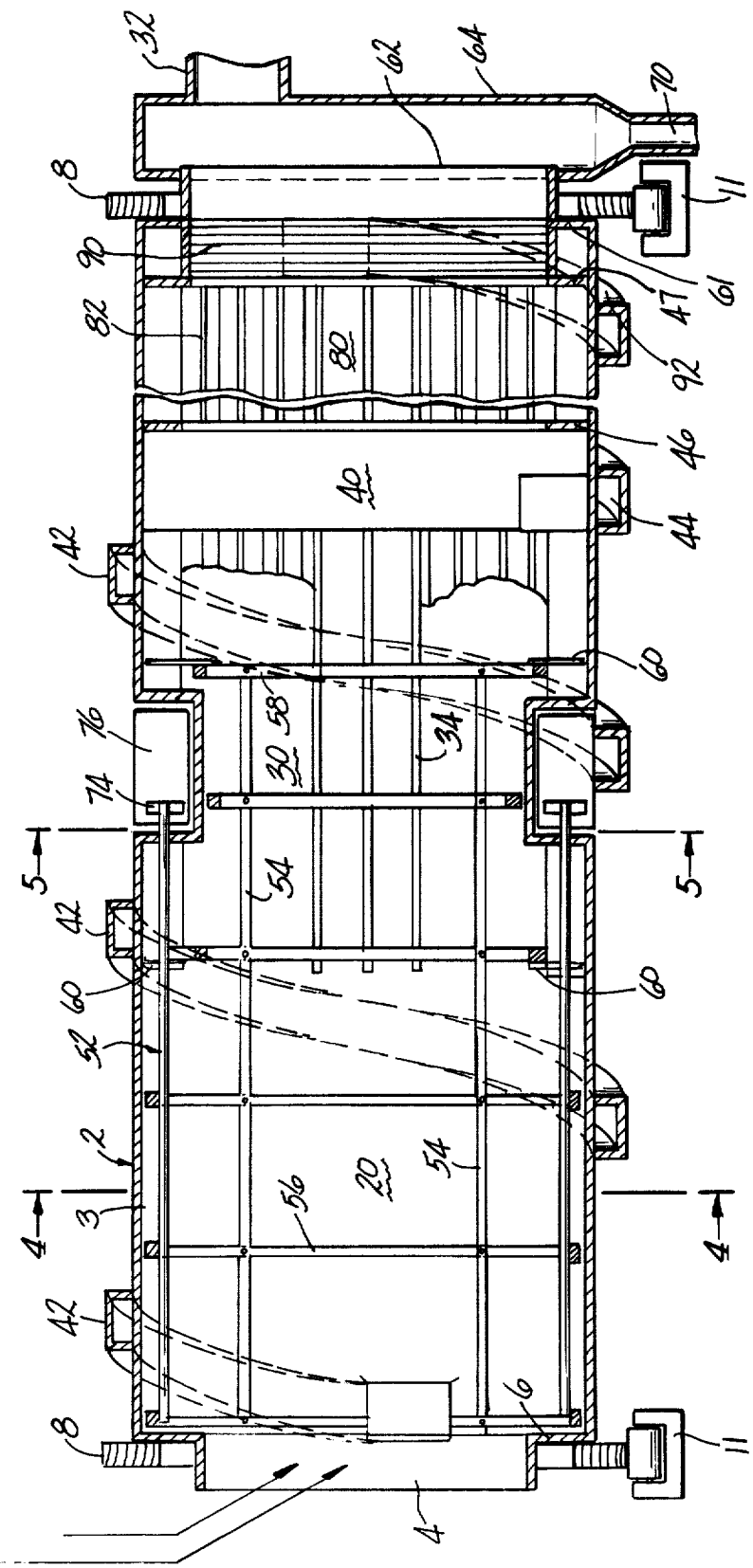
FIG. 3 is an elevational view in section of an alternate embodiment of the rotary apparatus which may be used in practicing the present invention.
Figure 4:
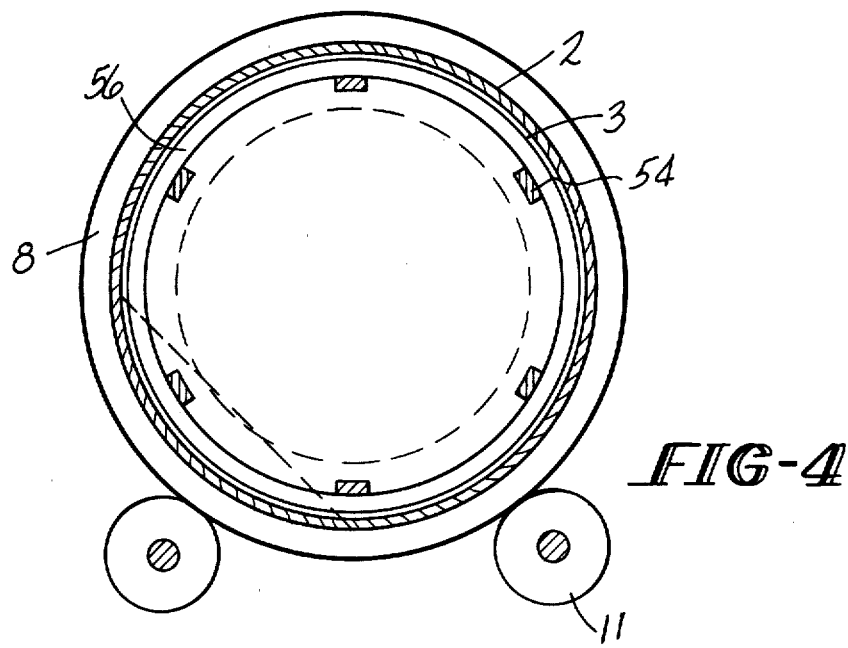
Figure 5:
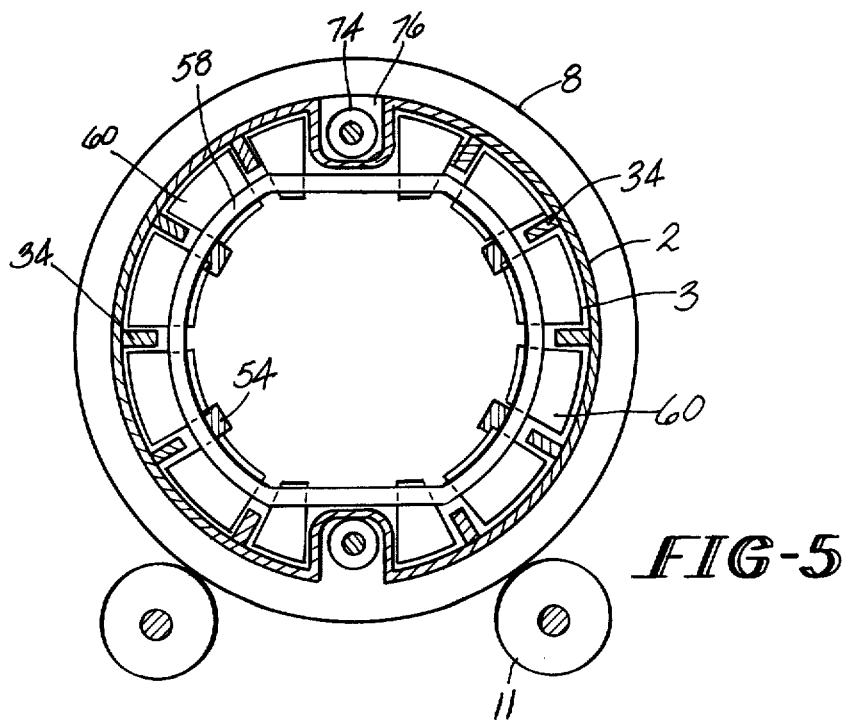

FIGS. 4 and 5 are cross-sectional views taken, respectively, along lines 4—4 and 5—5 of FIG. 3.

FIG. 6 is an elevational view in section of an additional alternate embodiment of the rotary apparatus which may be used in practicing the present invention.

FIG. 7 is a radial cross section taken along line 7—7 of FIG. 6.

Figure 8:
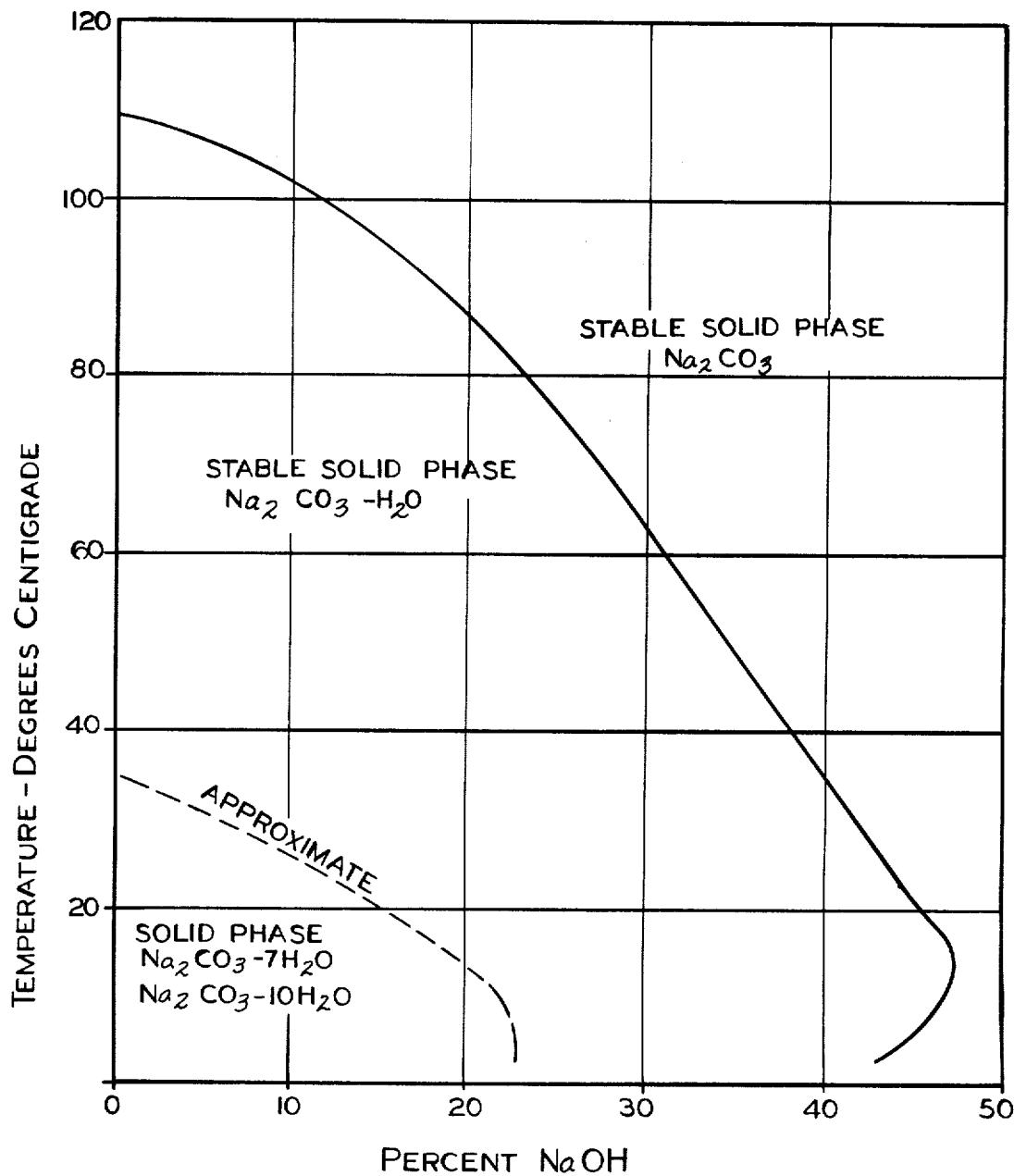

FIG. 8 depicts graphically stable solid phases of $Na_2CO_3$ in solutions of NaOH saturated with $Na_2CO_3$ in relation to temperature.

Referring to the drawings, and in particular FIG. 1, the rotary apparatus of the present invention includes generally a hollow cylindrical shell 2 having an inner wall 3, a feed end 4, and a discharge end 62. Two riding rings 8 are mounted on the external peripheral surface thereof. Shell 2 is mounted for rotation about its axis of elongation with the riding rings 8 riding on trunnion roll assemblies 11. Shell 2 is rotated by suitable ring gear and pinion drive 12 by motor 13. The axis of rotation may be tilted slightly from the horizontal with the discharge end 62 being the lower. Suitable end thrust rollers (not shown) may be provided, as well known in the art, to limit axial movement of shell 2.

Feed end 4 of shell 2 is open. The aperture diameter of end plate 6 is smaller than the shell diameter to prevent spillage of the bed out of the feed end. A liquid inlet 22 and a dry feed chute 24 extend through opening 4 into the interior of shell 2.

A stationary end housing 64 encloses the discharge end 62 of shell 2. End housing 64 is provided with gas duct 32.

Shell 2 contains a plurality of functional zones. The first zone is a pelletizing zone 20 into which are fed solid feed materials through dry feed chute 24 and liquid feeds through liquid inlet 22. Recycled feed particles are introduced into pelletizing zone 20 through recycle spiral conveyor 42 surrounding the exterior surface of shell 2.

Adjacent to pelletizing zone 20 is drying zone 30. Drying zone 30 contains at least one set of circumferentially spaced, radially extending flights 34. Radially extending flights 34 lift moist pellets from the bed of drying zone 30 to the top of drying zone 30 and release the pellets to fall separately through the drying zone to the bed. Gas duct 32 introduces warm gases for drying the pellets. After flights 34, inner wall 3 of shell 2 is bare, forming recycle zone 40 which separates drying zone 30 from the classification zone 50.

Recycle zone 40 contains inlet 44 to spiral conveyor 42 which recycles a portion of the dried pellets to pelletizing zone 20. Another portion of the dried pellets is transported by elevator and deflector scoop 45 over dam ring 46, having adjustable gate 48, into classification zone 50.

Classification zone 50 is conically shaped with the smaller diameter adjacent to recycle zone 40. Dried pellets are fed from recycle zone 40 by elevator and deflector scoop 45 to the center of classification zone 50. Small pellets flow back towards recycle zone 40 and are readmitted to recycle zone 40 through adjustable gate 48 in dam ring 46. Larger pellets flow towards discharge end 62. Large pellets overflow end plate 61 and enter discharge end 62 into end housing 64. From end housing 64, the dried pellets are discharged through opening 70.

As shown in FIG. 2, a set of flights 34 encircle the inner circumference of cylindrical shell 2 in drying zone 30. Rotation of cylindrical shell 2 in a clockwise direction deposits dried pellets in inlet 44 of recycle spiral conveyor 42. Recycled pellets sliding inside recycle spiral conveyor 42 are returned to pelletizing zone 20. Elevator and deflector scoop 45 deposits dried pellets into classification zone 50 downstream from dam ring 46 having adjustable gate 48. Return of the dried pellets from classification zone 50 to recycle zone 40 is controlled by adjustable gate 48.

In the alternate embodiment, shown in FIGS. 3, 4, and 5, the interior surfaces in the pelletizing, drying and recycle zones are made accessible to reciprocating scraper cage 52 to limit the uncontrolled buildup of glass batch materials on these surfaces.

Reciprocating scraper cage 52 is comprised of a number of longitudinal bars or rods 54 positioned parallel to the drum axis and shorter than the combined length of pelletizing zone 20, drying zone 30, and recycle zone 40 by the length of the stroke for reciprocating scraper cage 52. Longitudinal bars 54 are formed into a rigid assembly by a series of circumferential rings 56 in pelletizing zone 20 and circumferential rings 58 in drying zone 30. Circumferential rings 56 and 58 are spaced at intervals equal to the length of the stroke of scraper cage 52. In pelletizing zone 20, the outside diameter of circumferential rings 56 is slightly less than the inside diameter of inner wall 3. As rings 56 reciprocate along the surface of inner wall 3, the maximum thickness of glass batch ingredients adhering to inner wall 3 is limited to the open clearance between circumferential rings 56 and inner wall 3. In drying zone 30, the outside diameter of circumferential rings 58 is slightly less than the inside diameter of the lips of radial extending flight 34 to allow free movement of circumferential rings 58 back and forth along the flight lips. Attached to circumferential rings 58 in drying zone 30 are blades 60 contoured to fit between adjacent radial extending flights 34 and free to move back and forth between them. Buildup of glass batch materials on the sides of flights 34 and between flights 34 is thereby dislodged by the action of blades 60 as reciprocating scraper cage 52 moves back and forth inside drying zone 30 of shell 2. At suitable intervals around the perimeter of shell 2 are located reciprocating pistons 74 driven hydraulically or pneumatically and connecting to reciprocating scraper cage 52 to provide the motive power for the movement of the reciprocating scraper cage 52. Since circumferential rings 56 and 58 are spaced apart by the length of the stroke of cage movement, the entire surface of inner wall 3 is thereby accessible to blades 60 attached to reciprocating scraper cage 52. If required, the circumferential rings 56 and 58 can be offset or deformed to whatever extent required to avoid interference with other fixed obstructions in the interior of shell 2 such as housings 76 required to support reciprocating pistons 74 for scraper cage 52 as shown in FIGS. 3 and 5. Recycle zone 40 houses inlet 44 to spiral conveyor 42 which recycles a portion of the pellets entering from drying zone 30 to pelletizing zone 20. Pellets passing over dam ring 46 enter supplemental drying zone 80 fitted with lifter flights 82 which cascade the pellets through heated drying gases fed through gas duct 32. Supplemental drying zone 80 is employed to further reduce the moisture content of the pellets entering from recycle zone 40 prior to their being fed to trommel screen 90. The supplemental drying of the pellets prevents the buildup of moist solids on trommel screen 90 which is employed as an alternate embodiment of pellet classification. Undersized pellets and fines which pass through the openings of trommel screen 90 collect between dam ring 47 and end plate 61 and are passed through inlet 92 of spiral conveyor 42 to be recycled to pelletizing zone 20.

A further alternate embodiment of the apparatus of the present invention is illustrated in FIGS. 6 and 7 in which a full length stationary scraper blade 66 is positioned in the upper portion of cylindrical shell 2. Stationary scraper blade 66 is attached to stationary axle 68 by support bars 72. Drying zone 30 houses cylindrical flight cage 84 having an outside diameter slightly smaller than the inside diameter of cylindrical shell 2 where stationary scraper blade 66 is positioned in the intervening clearance between inner wall 3 of cylindrical shell 2 and cylindrical flight cage 84. As best illustrated in FIG. 7, cylindrical flight cage 84 has end rings 86 to which are attached radial flights 88 and support spokes 94. Support spokes 94 are also attached to hub 96. Cylindrical flight cage 84 is in frictional contact with inner wall 3 along the bottom of cylindrical shell 2 whereby cylindrical flight cage 84 rotates in the direction in which cylindrical shell 2 rotates as indicated in FIG. 7.

FIG. 8 is a diagram which indicates the stable solid phases of $Na_2CO_3$ in solutions of NaOH of varying concentrations and temperatures where the NaOH solution is saturated with $Na_2CO_3$.

In the process of the present invention, glass batch pellets are formed in the pelletizing zone of the apparatus. The pellets are produced from a feed mix which includes ingredients which provide $SiO_2$, CaO, MgO, $Na_2O$, $K_2O$, and other components which may be employed in the production of glass.

Glass batch pellets produced by the process of the present invention may contain the ingredients for producing commercial silicate glasses as given, for example, in Table 3 on pages 542–543 of volume 10 of the Kirk-Othmer *Encyclopedia of Chemical Technology*, 2nd edition, 1966. This table includes compositions containing $SiO_2$, $Al_2O_3$, $B_2O_3$, $Li_2O$, $Na_2O$, $K_2O$, MgO, CaO, PbO as major constituents with other ingredients listed as well, with the desired ratios employed in glass manufacture given in percent by weight. Preferred are glass batch pellets for silicate glass compositions whose principle use is for flat glass, container glass, lighting ware, laboratory ware, light bulbs, and tumblers as well as in glass fiber insulation. More preferred glass batch pellets are those whose compositions are suitable for the production of soda-lime glasses used in flat glass, containers and incandescent light bulbs or tubes. A widely employed soda-lime glass composition contains (as percent by weight) 72 percent silica, 15 percent $Na_2O$ and 10–13 percent CaO (or CaO and MgO) with perhaps minor amounts of other metal oxides.

Sand is preferably used to supply the $SiO_2$ requirements although, for example, alkali metal silicates may be employed. Any sand which is suitable for use in glass production may be employed. Sand particles are normally employed having the size distribution ranges of the natural product. Size reduction by crushing is generally not required.

The calcium carbonate source employed includes limestone, dolomite, calcium carbonate, aragonite, calcite and mixtures thereof. Mixtures of a calcium carbonate source such as limestone or dolomite with lesser amounts of burnt lime, burnt dolomite, or hydrated lime may also be used. Suitably the calcium carbonate may have a particle size corresponding to that of the sand used. Particle sizes preferred, for example, are those where about 90 percent of the particles are minus 100 mesh and smaller. Pellet formation is facilitated by using more finely comminuted-limestone or dolomite.

The $Na_2O$ requirements of the pellets are provided by employment of an aqueous solution of sodium hydroxide. Any suitable concentrations of aqueous solutions of sodium hydroxide may be fed to pelletizing zone 20. While it is preferred to use NaOH to supply the entire $Na_2O$ requirements of the glass batch mixture, as stronger pellets are obtained, it may be economically advantageous to use sodium carbonate, $Na_2CO_3$, as a partial replacement for NaOH. $Na_2CO_3$, dry or as an aqueous solution, can be employed to supply up to about 50 percent of the $Na_2O$ requirements. However, where mixtures of NaOH and $Na_2CO_3$ are used, it is preferred that the substitution of $Na_2CO_3$ for NaOH be in the range of from about 1 to about 25 percent of the $Na_2O$ requirements. It is also preferred that the $Na_2CO_3$ fed to the pelletizing zone be in the form of an aqueous solution.

In addition to these basic ingredients, the glass batch may contain a large number of additives which are commonly used in glass production such as feldspar and salt cake ($Na_2SO_4$) as well as those which supply $Fe_2O_3$, $TiO_2$, $SO_2$, and oxides of other metals of Groups III, IV, V, and VIII of the Periodic Table.

During starting operations, the moving bed may initially consist of any suitable source of chemically compatible aggregated solids in the approximate size range of the glass batch pellets to be produced. For example, silica pebbles or crushed limestone can be used initially to constitute the moving bed. As suitably sized glass batch pellets are produced, the aggregated solids in the bed are replaced.

In producing glass batch pellets by the process of the present invention, sand, the calcium carbonate source and other dry solid ingredients are fed either separately or as a blend onto a rolling or tumbling bed of recycled pellets in the pelletizing zone in suitable amounts to provide the desired ratios of $SiO_2$ and CaO in the glass batch.

The sodium hydroxide solution is fed or dispersed onto the rolling or tumbling bed of recycled pellets from the recycling zone. The feed rate of the aqueous solution is controlled to wet the solid ingredients and maintain a cohesive condition between the sand, calcium carbonate source, other glass batch ingredients, and recycle pellets while providing the desired amounts of $Na_2O$. The dry glass forming solid ingredients are preferably fed onto the bed in close proximity to the caustic solution feed point. The sodium hydroxide solution is a source of soluble solids in the composition of the pellets and has a concentration in the range of from about 25 to about 75 percent by weight of NaOH. The sodium hydroxide solution usually contains sufficient water to form a tacky surface on the recycle pellets to which the sand and limestone particles adhere to form a new layer.

The recycle pellets used as seed particles in the pelletizing zone provide a core of sufficient strength so that the new layers of solids formed by subsequent deposition of the feed ingredients can endure drying without cracking or deformation. Water required to control the degree of wetness of the bed is normally provided in the aqueous solution of the $Na_2O$ source; however, water may also be added separately. The bed temperature may also be raised or lowered to control the rate of water evaporation.

Bed temperatures in the pelletization and drying zones are maintained within limits defined by FIG. 8 covering those combinations of temperature and caustic concentration for which the stable solid phase is the monohydrate of sodium carbonate, $Na_2CO_3 \cdot H_2O$. As soon as sodium carbonate forms under conditions defined by the monohydrate region depicted on FIG. 8, the $Na_2CO_3$ combines with a portion of the water contained within the pellet to form the crystalline monohydrate of sodium carbonate. The water of hydration of $Na_2CO_3 \cdot H_2O$ is 17% of the weight of $Na_2CO_3$. Pellets having a moisture content of more than 4% by weight carry sufficient water to allow the hydration of all of the $Na_2CO_3$ in the pellet. Sodium carbonate is formed primarily by the reaction of the NaOH with the carbonate ion of the calcium carbonate source. An additional source of sodium carbonate of lesser importance is by the absorption of $CO_2$ present in combustion gases fed to the pelletizing zone. Crystalline $Na_2CO_3.H_2O$ is also formed when water is volatilized from solutions of $Na_2CO_3$. The formation of sodium carbonate monohydrate in the pellet layer provides the desired bonding strength to the pellet.

The NaOH concentration of the residual solution in the pellets may initially be equal to that in the feed solution of NaOH. NaOH concentration declines because of reaction with the carbonate ion in the calcium carbonate source or with $CO_2$. Dilution of NaOH may also occur due to supplemental additions of water. On the other hand, the evaporation of water within the drying zone tends to increase the concentration of the NaOH. The temperature of the combustion gases in the drying zone may be increased or decreased to establish control over the bed temperature and the water evaporation rate.

When 50 percent NaOH is used as the feed concentration of the NaOH, it has been determined that the rate of reaction of the NaOH with dolomite as the calcium carbonate source is sufficiently rapid to reduce the residual NaOH concentration in the liquid phase present in the pellets to concentrations less than 30 percent. In this instance, to form crystalline $Na_2CO_3.H_2O$ as shown in FIG. 8, the bed temperature can be allowed to reach a maximum temperature of about 60° C. On the other hand, where calcite or aragonite are used as calcium carbonate sources, the reaction was found to be somewhat slower, allowing residual concentrations of NaOH in the liquid phase in the pellets to remain near 35 percent. Under these conditions, the maximum allowable bed temperature was about 50° C. If bed temperatures exceed these maximum limits, the crystalline $Na_2CO_3.H_2O$ melts releasing the water of hydration. Bond strength provided by the crystalline monohydrate is then reduced and the pellet structure is degraded.

In further consideration of the allowable combinations of bed temperature and NaOH concentration as shown in FIG. 8, it is evident that the use of more dilute NaOH feed solutions may allow an increase in the operating rate of the pelletizer. Thus less reaction time is needed to reduce the caustic concentration to sufficiently low values to permit bed temperatures in the range from about 50° to about 80° C., to be employed, bed temperatures which are preferred during pellet formation. These preferred bed temperatures are conducive to faster water evaporation rates required because of the use of the more dilute NaOH. The higher allowable bed temperature for dolomite as compared to calcite or aragonite as calcium carbonate sources may be attributed to the more rapid reaction of NaOH with the $MgCO_3$ in the dolomite. By similar analogies, it may also be inferred that more finely pulverized feeds of limestone or dolomite will react with the NaOH more rapidly than coarser materials, thereby allowing operation at both a higher bed temperature and also at a higher operating rate. Operation of the pelletizing zone at bed temperatures less than 50° C. is permissible with the appropriate concentrations of NaOH solutions. However, the reaction rate of NaOH with the calcium carbonate source and the water evaporation rate are both retarded and the maximum operating rate of the pelletizer is reduced.

The utilization of the relatively dilute sources of NaOH solution in the range of 10 to 30 percent allows the use of bed temperatures in the range of 60° to 100° C., suitably high to achieve an accelerated rate of reaction of the NaOH with the $CaCO_3$ or $MgCO_3$ and also provide for an equally rapid rate of volatilization of the water fed to the pelletizer with the caustic solution.

Bed transport within the rotating drum moves the moist coated seed pellets into the drying zone. Heated gas, for example, air or combustion gases, contacts the glass batch pellets to evaporate and remove water. Water in the caustic solution in excess of that required to maintain pellet residual moisture content is immediately volatilized in the drying zone. This causes the $Na_2CO_3$ formed by the reaction of NaOH with carbonate ion or $CO_2$ to crystallize and prevents the migration of the soluble $Na_2O$ components into subsequently deposited layers. Radial lifter flights installed in the drying zone lift the layered pellets to the upper portion of the drying zone and release them to fall separately through the heated gas and thus provide for controlled heat transfer. While radial flights are preferred, the drying zone may comprise a rotary kiln or contain rotary louvers.

Where the heated gas used for drying is a combustion gas, carbon dioxide is present. During the evaporation of water, absorption of carbon dioxide from the drying gases onto the newly deposited layer reacts with the NaOH and aids in the formation of crystalline bonds of sodium carbonate. This further prevents the migration of soluble soda compounds into subsequently deposited layers of feed materials onto the surface of the pellets. Carbon dioxide also reacts with calcium hydroxide [$Ca(OH)_2$] produced during the reaction of NaOH with the calcium carbonate source, and where present, with magnesium hydroxide to form calcium carbonate and magnesium carbonate. Formation of crystalline bonds in the newly deposited layers strengthens and toughens the pellets. The formation of $Na_2CO_3$ by the reaction of NaOH with $CaCO_3$ and $MgCO_3$ or by the absorption of $CO_2$ by NaOH also neutralizes hygroscopic properties of the caustic soda.

Gases, such as air and flue gases used in drying the pellets are at temperatures in the range of from about 100° to about 300° C., and preferably from about 100° to about 200° C. Where combustion gases containing $CO_2$ are used in the drying zone, suitable amounts of $CO_2$ include those from about 1 to about 30 percent by weight of the hot gas.

The pellets are retained in the drying zone for a period sufficiently long to evaporate water in excess of that required to provide the dried pellets with the desired residual moisture content, the layered pellets in the drying zone being maintained at a temperature in the range of from about 20° to about 100° C. Suitable drying times include those of from about 2 to about 20 minutes. The dried pellets have a residual moisture content in the range of from about 4 to about 12 percent, preferably from about 5 to about 9 percent and more preferably from about 6 to about 8 by weight. Residual moisture includes water of hydration and free water present in the pellet.

Dried pellets pass through the inlet of spiral recycle conveyor 42 and are returned to the pelletizing zone as recycle pellets. Also returned to the pelletizing zone through spiral recycle conveyor 42 are unagglomerated dry solids such as sand and limestone. A portion of dried layered pellets is transferred to classification zone 50 by elevator and deflector scoop 45. Scoop 45 is adjustable between a zero bed depth setting wherein the inlet end of the scoop 45 is in engagement with the internal periphery of shell 2 and a full bed depth wherein the inlet end of scoop 45 is at a height at least equal to that of adjustable gate 48.

Pellets from recycle zone 40 are deposited by elevator and deflector scoop 45 near the center of classification zone 50. In the rotating conical classification zone, the smaller pellets segregate at the smaller diameter adjacent to recycle zone 40. The flow of smaller pellets back into recycle zone 40 is regulated by adjustable gate 48. To minimize direct by-passing of small pellets and unagglomerated sand and limestone back into the classification zone, elevator and deflector scoop 45 is positioned in relation to adjustable gate 48 and conveyor inlet 44. Larger pellets deposited in classification zone 50 will move towards the larger diameter of the cone. The bed depth in the classification zone is regulated by end plate 61. Pellets overflowing this barrier enter discharge end 62 and are discharged from end housing 64 through opening 70.

Classified layered pellets exiting from classification zone 50 have a diameter of from about 1.5 to about 26 and preferably from about 3 to about 20 millimeters.

During extended periods of operation, a slow progressive rate of buildup of glass batch materials occurs on inner wall 3 within pelletizing zone 20 and drying zone 30 where contact occurs with the pelletized bed of material. This buildup is undesirable as it will ultimately reduce the operating efficiency in the pelletizing and drying zones. The buildup of glass batch materials can be limited to inconsequential amounts by use of suitably designed scraper systems. One such system is shown and described in FIG. 3. A slow rate of reciprocation of such a reciprocating scraper cage dislodges any buildup in excess of the clearance between the moving scraper surface and the surfaces of inner wall 3. The dislodged material is reincorporated in or recycled to the bed of pellets in the pelletizing zone. The freshly deposited solids forming the buildup are of a sufficiently soft texture to allow easy disengagement without reaction stress in excess of the rigidity limits of the cage assembly. In an appropriately designed cage, the unscraped inner surfaces of the scraper cage itself are of an insufficient area to cause concern for glass batch materials adhering to these surfaces.

In an alternate embodiment of the scraper blade illustrated in FIGS. 6 and 7, the buildup of solids on the walls of the apparatus is limited by a stationary scraper blade positioned close to the inner wall of the drum. Clearance for the operation of a stationary scraper blade in the drying zone is achieved by using a detached flight cage in lieu of the rigidly attached flights employed in the apparatus illustrated in FIGS. 1, 2 and 3.

In the alternate embodiment for classification of the product pellets using a trommel screen as shown in FIG. 3, the pellets from recycle zone 40 are dried further in supplementary drying zone 80 sufficiently to prevent any significant buildup of moist solids on the trommel screen wires. The buildup of solids impairs the classification of pellets by the trommel screen. Superficial drying is provided by a supplementary drying section furnished with radial flights to induce accelerated heat transfer between the hot gases and the pellets by cascade of the pellets through the hot gases. These dried pellets, having a moisture content of from about 0.1 to about 1.0 percent by weight less than pellets entering supplementary drying zone 80, then progress onto the trommel screen where "on-size" pellets continue to the discharge opening of the pelletizer drum. The undersized pellets and fines fall through the screen and are returned to pelletizing zone 20 through spiral conveyor 92 and 42.

The novel process of the present invention produces multi-layered pellets having a homogeneous cross-sectional composition from the interior to the surface. By producing pellets by the formation of thin layers (onion-skin increments) by depositing moist glass batch ingredients on a dry substrate on each pass through the recycle system, migration of soluble NaOH is prevented. The repeated recycle of the pellet through the pelletization zone and drying zone, for example, up to as many as 20 recycles, converts the major portion of NaOH in the layer to the less soluble and non-hygroscopic sodium carbonate monohydrate. This process imparts strength and hardness to the multilayer pellet which is not attainable by the singlestep procedures previously employed in preparing glass batch pellets. Because of the low concentrations of residual moisture in pellets recycled or recovered from the drying zone, dehydration and pre-heating can then be effected in a subsequent operation with no further migration of soluble soda compounds occurring. Multilayered pellets produced by the novel process of the present invention can endure storage and handling and pre-heating treatments without excessive breakdown and dust formation.

Novel layered spherical pellets produced by the process of the present invention have a controlled range of particle sizes. The pellets are of a homogeneous composition in which segregation of components such as $Na_2O$ is minimized. The pellets are non-cohesive so that each pellet can float independently on molten glass. The novel layered spherical pellets have a specific gravity in the range of from about 1.90 to about 2.30, and preferably from about 2.00 to about 2.20. These high densities result in the layered pellets having good thermal conductivity. However, the density of the pellets is less than that of the glass melt so that the pellets melt on the surface of molten glass without sinking into the molten glass thereby optimizing heat transfer in the glass production process. The layered pellets melt at temperatures below which substantial amounts of pollutants such as nitrogen oxides are generated from the glass melt. The novel layered spherical pellets are non-hygroscopic and can be stored for extended periods of time without clumping or agglomerating. Crushing strengths are in the range of from about 50 to greater than 250 pounds and provide the pellets with sufficient hardness so that additional handling will not produce significant amounts of dust or fine particles. In addition, the pellets are resilient and can be dropped onto hard surfaces without splitting or shattering.

The following examples are intended to further illustrate the present invention and are offered without any intent to pose any limitations upon the present invention.

EXAMPLE 1

A drum, cylindrical in shape, 30.5 centimeters in diameter and 25.4 centimeters long and having a sealed flat bottom was mounted on a flange so that the drum axis was horizontal. The flange was attached to the horizontal output shaft of a motorized speed reducer geared for an output shaft speed of 29 rpm. The other end of the drum was fitted with a conical restriction terminating in an access opening 15.2 centimeters in diameter. The interior of the drum was fitted with 12 radial flights 2.5 centimeters in height secured at points approximately equidistant around the interior wall. As the initial seed bed, about 4.5 kilograms of screen pellets about 6.5 millimeters in diameter were loaded into the drum, a mixture of screened sand (+0.42 mm) and finely pulverized limestone was prepared in amounts which provided a $SiO_2$ ratio to CaO of 72:13. The mixture was added to the drum in 1.125 kilogram increments. Heat was provided by a gas-oxygen torch burning liquified petroleum gas (LPG) whose flame was projected into the interior of the drum through the upper portion of the 15.2 cms. access opening. A 50 percent caustic solution was projected horizontally into the drum in the lower portion of the access opening and at an angle with respect to the drum axis to allow caustic impingement near the mid-point of the cascading bed inside the drum. Caustic projection was by feeding the caustic at a regulated rate into an air stream of sufficient velocity to break the liquid into droplets and to project these droplets about 20.3 cms. into the interior of the drum before contacting the cascading dry solids and recycle pellets. The caustic solution was fed to the drum in amounts which provided a ratio of $SiO_2$ to $Na_2O$ of 72:15 to the glass batch feed. The bed temperature was in the range of 90° to 100° C. The pelletization process was run with the drum rotating at 29 rpm until a total of 9 kilograms of the sand-limestone feed mix had been fed to the drum. The central portion of the access opening between the flame and the caustic spray provided access for intermittent manual additions of dry feed. Excess material inside the drum, due to buildup of the bed, was allowed to spill out of the access opening into a pan. The material was screened and undersized material returned to the drum through the access opening. $CO_2$ present in the combustion gas contributed to the carbonation of the caustic in the feed. The time required to pelletize 9 kilograms of feed mix was about 2 hours. At the end of the pelletization run, 6.75 kgs. of pellets were recovered along with 2.25 kgs. of unpelletized fines. The layered pellets were dried. The dry layered pellets produced were sufficiently hard so that they could not be crushed by hand. Pellet sizes in the product were in the range of from 3 to 16 millimeters in diameter. Due to the short length of the drum, the pelletization and drying zones in this example were actually super-imposed onto one another. Recycle was therefore not required. While this tended to impair the degree of controllability of bed moisture for maximum pellet strength, the pelletized product exhibited sufficient strength for subsequent pre-heating without breaking.

EXAMPLE 2

A dry blend of glass batch ingredients was prepared having the following composition:

| Component: | Sand | Dolomite | Feldspar | Salt Cake | Total |
|---|---|---|---|---|---|
| % by weight: | 70.6 | 21.2 | 7.1 | 1.1 | 100.0 |

Pelletizing apparatus of the type illustrated in FIG. 6 was employed having a pelletizing zone, a drying zone and a conical classification zone. The apparatus was 45.7 cms. in diameter and 152.4 cms. long. A stationary scraper blade supported on a tubular axle coinciding approximately with the axis of the apparatus was provided to limit the buildup of glass batch materials on the inner wall of the pelletizing zone and drying zone. A detached flight cage, also supported by the tubular axle, was employed having a diameter slightly smaller than the internal diameter of the pelletizing apparatus to provide clearance for the scraper blade. The flight cage rested on the bottom side of the pelletizer and rotated with the pelletizer to induce cascading of the pellets which remained enmeshed with the cage. Attached to the discharge end of the pelletizer was a burner for gaseous fuels to provide the hot combustion gases necessary for heating the bed of pelletized solids and for volatilizing water.

The pelletizer was loaded with a 13.5 kilogram bed of pellets 3 to 8 millimeters in diameter. The dry blend was fed continuously onto the revolving bed in the feed end of the pelletizer. Also sprayed continuously onto the revolving bed was a 50 percent aqueous solution of NaOH at a rate of 0.9 kgs. per 2.54 kgs. of dry blend. An axial inclination of the pelletizer of 0.23 cms. per meter transported the pellets progressively from the feed end to the discharge end of the pelletizer. A major portion of the pellets reaching the recycle zone entered the spiral conveyor and were recycled to the pelletizing zone. The remaining pellets overflowed into the conical classification zone and were collected as product at the discharge end. The pellet bed temperature was maintained in the range of 45° to 55° C. Water fed in association with the 50 percent NaOH solution was volatilized at rates in the range of 3.2 to 6.75 kilograms per hour. Dry blend feed rates allowed by these water evaporation rates ranged from 32 to 45 kilograms per hour. Under conditions of excessive drying of the pellet bed, supplemental additions of water were made with the caustic solution to maintain pellet moisture levels in the range of 6 to 8 percent.

The size of the spherical pellets produced ranged from 8 to 15 millimeters in diameter. The pellets were too hard to be crushed or deformed by finger pressure. Pellets dropped onto hard surfaces from heights of 20.3 to 25.4 cms. remained intact and exhibited resiliency.

EXAMPLE 3

A dry blend of glass batch ingredients was prepared having the following composition:

| Component: | Sand | Aragonite | Feldspar | Salt Cake | Total |
|---|---|---|---|---|---|
| % by weight | 70.6 | 21.2 | 7.1 | 1.1 | 100.00 |

Aragonite is a mineral form of calcium carbonate. Using the apparatus and procedure of EXAMPLE 2, a 50 percent NaOH solution and the dry blend were continuously fed into the pelletizer in amounts of 0.9 kg. of NaOH per 2.54 kgs. of dry blend. Pellet bed operating temperatures in the range of 40° to 45° C. were found to be most conducive towards the growth of pellets with satisfactory strength. At these temperatures, the volatilization rate of water was about 5 lbs./hr. Dry blend feed rates employed at this water evporation rate were in the range of 40 to 60 lbs./hr. Pellets produced having a moisture content in the range of 6 to 8 percent were firm and hard. Pellets produced having moisture concentrations of 9 to 10 percent were sufficiently soft to be deformed by finger pressure, but were still sufficiently strong to endure the cascade in the drying section of the pelletizer without deformation or breaking.

EXAMPLE 4

The pellets produced during the operations described in EXAMPLES 2 and 3 were placed on a steel grate in the bottom of a square steel enclosure measuring 30.5 centimeters on each side to form a bed of pellets 30.5 cms. deep. Attached to the side of the enclosure below the grate was a burner of sufficient capacity to develop combustion gas temperatures in combination with secondary air in the range of 150° to 500° C. The burner and the enclosure below the grate were completely enclosed to force the flow of heated combustion gases upward through the grate and through the bed of pellets. Thermometers were located immediately below the grate and also in the uppermost layer of the bed to measure the temperatures of the gases and the pellets.

The bed, containing pellets measuring about 1.3 cms. in diameter and having an initial moisture content in the range of 6 to 8 percent, was completely dehydrated when heated to 300° 1 C. in 1 hour. A second bed of pellets measuring about 1.6 cms. in diameter and having the same moisture content, was completely dehydrated when heated to 300° C. in 1.5 hours. A third bed of pellets in the size range of 1.9 cms. to over 2.54 cms. required up to 2.5 hours for complete dehydration by heating to 300° C. Heating rates more rapid than those indicated above resulted in spalling and explosion of some pellets due to the buildup of vapor pressure within the pellets in excess of atmospheric and also due to excessive strain due to the high thermal gradients from the surface of the pellets inward. Pellets dehydrated and preheated at the above heating rates were hard and strong. Anhydrous pellets dropped from a height of 1.8 to 3 meters onto a hard surface rebounded 10 to 30 percent of the distance dropped without breaking, indicating characteristics of strength, hardness, rigidity, and elasticity.

EXAMPLE 5

The specific gravity and crushing strength were determined for layered spherical glass batch pellets produced by the process of Example 2. The glass batch pellets had the following composition:

| Component | Sand | Dolomite | Feldspar | Salt Cake |
|---|---|---|---|---|
| % by weight | 70.6 | 21.2 | 7.1 | 1.1 |

In determining the specific gravity, the average diameters of the pellets of known weight were determined by direct measurement with calipers of the diameters of eight different areas of each pellet. The specific gravity was found to be 2.07 grams per cubic centimeter. Crushing strength was determined on a Hounsfield Tensometer and found to be in the range from 120 to over 250 lbs.; 250 lbs. being the upper limit of the instrument. In addition, four pellets were analyzed to determine the concentration of $Na_2O$ in the core and at the surface of the pellet. The results were as follows:

|  | 1 | 2 | 3 | 4 | Avg. |
|---|---|---|---|---|---|
| % Conc. of $Na_2O$(core) | 15.11 | 13.73 | 14.12 | 14.11 | 14.26 |
| % Conc. of $Na_2O$(surface) | 14.29 | 13.85 | 13.69 | 13.53 | 13.84 |

(analytical accuracy limits: 0.5–1.0%)

The above determinations show that the novel pellets of the present invention have excellent crushing strengths and high densities as desired. The pellets have a homogeneous composition and there is no indication of significant migration of $Na_2O$ from the core of the pellets to the surface.

EXAMPLE 6

The specific gravity and crushing strength of layered spherical glass batch pellets, prepared by the process of Example 3 and using the composition of Example 3 in which aragonite is the calcium carbonate source, were determined. The specific gravity was determined by the procedure used in Example 5 and was found to be 2.13 grams per cubic centimeter. Pellet crushing strengths in the range of 50 to 90 lbs were determined using the Hounsfield Tensometer and the procedure of Example 5.

EXAMPLE 7

Layered spherical glass batch pellets were prepared using the glass batch composition of Example 2 in which calcite was substituted for dolomite as the calcium carbonate source; the composition having the same weight ratio of components. The specific gravity was measured by the method of Example 5 and found to be 2.17 grams per cubic centimeter. Pellet crushing strengths were in the range of 120 to over 250 lbs when determined by the method of Example 5.

What is claimed is:

1. A continuous process for the production of layered pellets for glass production, which comprises the following steps:
   (a) maintaining in a pelletizing zone of a rotary apparatus a moving bed of recycle pellets,
   (b) feeding sand and particles of a calcium carbonate source into said pelletizing zone,
   (c) feeding a $Na_2O$ source comprised of a solution of sodium hydroxide into said pelletizing zone, said recycle pellets being coated with a layer comprised of said solution of sodium hydroxide, said sand and said calcium carbonate source and forming layered pellets,
   (d) passing said layered pellets into a heated drying zone to form dried layered pellets, said dried layered pellets having a residual moisture content of from about 4 to about 12 percent by weight,
   (e) passing said dried layered pellets from the drying zone to a recycle zone,
   (f) recycling a portion of said dried layered pellets to said pelletizing zone as said recycle pellets, and
   (g) recovering a portion of said dried layered pellets from said recycle zone.

2. The process of claim 1 in which said calcium carbonate source is selected from the group consisting of limestone, dolomite, calcium carbonate, aragonite, calcite, and mixtures thereof.

3. The process of claim 2 in which said layered pellets have a bonding agent crystalline sodium carbonate monohydrate.

4. The process of claim 1 in which prior to step (g), a portion of said dried layered pellets is passed into a classifying zone.

5. The process of claim 3 in which said sodium hydroxide solution fed to said pelletizing zone has a concentration in the range of from about 25 to about 75 percent by weight of NaOH.

6. The process of claim 5 in which said layered pellets in said drying zone are heated by passing a stream of gas through said drying zone, said layered pellets in said drying zone being maintained at a temperature in the range from about 20° to about 100° C.

7. The process of claim 5 in which said calcium carbonate source is admixed with a minor portion of burnt lime or hydrated lime.

8. The process of claim 5 in which said calcium carbonate source is limestone.

9. The process of claim 5 in which said calcium carbonate source is dolomite.

10. The process of claim 8 or claim 9 in which said $Na_2O$ source is a mixture of sodium carbonate and said sodium hydroxide solution where said sodium carbonate supplies up to about 50 percent of the $Na_2O$ requirements.

* * * * *